C. J. BARROW.
METHOD OF WORKING GLASS.
APPLICATION FILED AUG. 21, 1913.
1,194,124.
Patented Aug. 8, 1916.
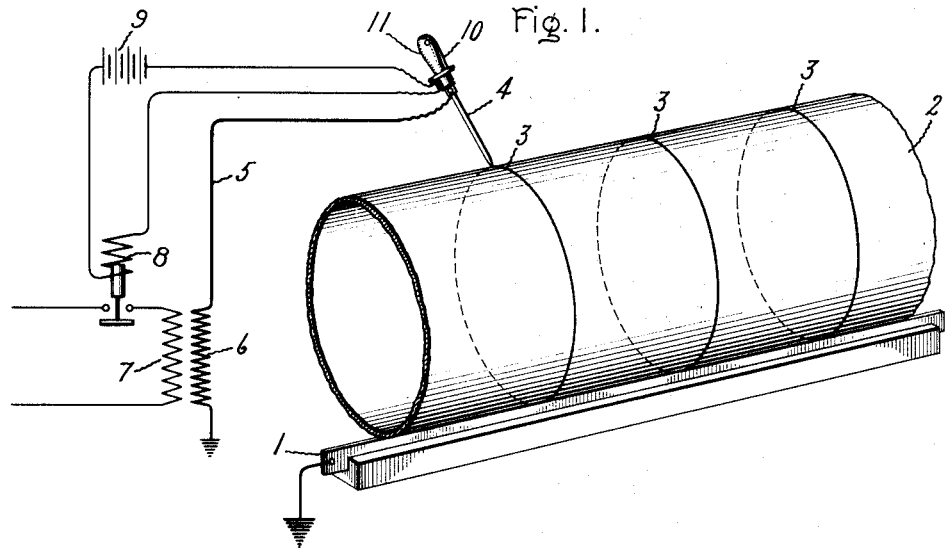
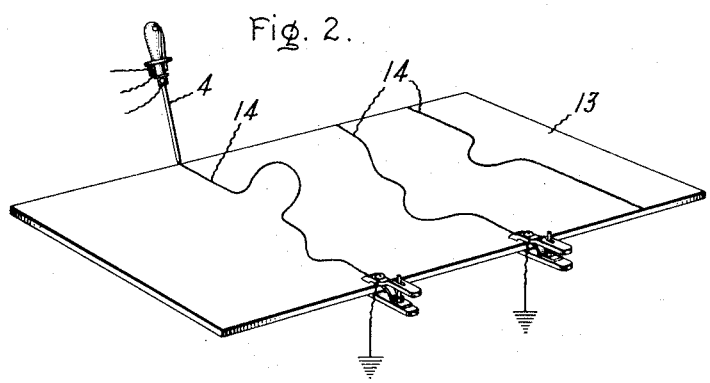
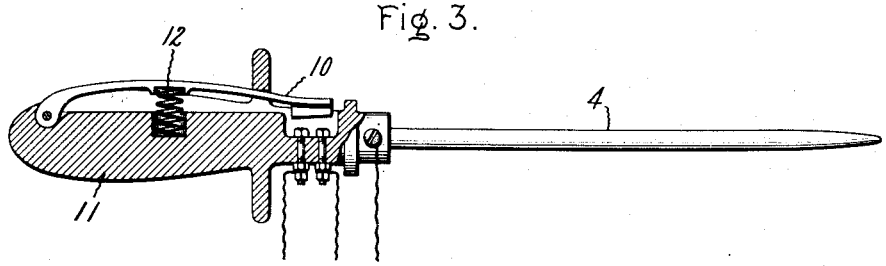
Witnesses:
George H. Tilden
J. Ellis Glen.
Inventor:
Charles J. Barrow,
by Albert G. Davis
His Attorney.

UNITED STATES PATENT OFFICE.

CHARLES J. BARROW, OF LOS ANGELES, CALIFORNIA.

METHOD OF WORKING GLASS.

1,194,124.  Specification of Letters Patent.  Patented Aug. 8, 1916.

Application filed August 21, 1913. Serial No. 785,848.

*To all whom it may concern:*

Be it known that I, CHARLES J. BARROW, a citizen of the United States, residing at Los Angeles, county of Los Angeles, State of California, have invented certain new and useful Improvements in Methods of Working Glass, of which the following is a specification.

My invention relates to the working of glass, porcelain and similar material, and more particularly to the cutting by means of electricity of cylinders and sheets of glass and similar material into any desired shape.

The object of my invention is to provide a simple and efficient way of cutting glass, porcelain and similar material even when of considerable thickness without subjecting the material to mechanical strains or pressure which would cause breakage.

A further object of my invention is to provide a way by which glass and similar material may be cut in irregular and special shapes with great ease and facility.

A still further object is to provide a method of glass working which has advantages in particular cases over the glass cutting methods at present in use, such as cutting by means of a diamond by a hot wire, and by other well known devices.

In accordance with my invention, I cut the glass or similar material by directing on its surface a current of electricity of sufficient intensity to separate the glass along the line of current flow. The path of current flow on the surface of the glass may be fixed or determined in various ways; but preferably I paint or otherwise make upon the surface of the glass a conducting path, and then apply potential to the conducting path, thereby causing sufficient current to flow along the surface of the glass to separate it along the line mapped out. The conducting path may be made in many different ways, but I prefer to mark it upon the glass by a suitable conducting ink or paint which may be made conducting by the addition of powdered carbon, graphite or other conducting particles.

My invention may be used to advantage in various glass working operations, as for example, in the manufacture of window glass, where long cylinders of glass are cut transversely into short sections, which are then cut longitudinally and flattened out. Both the transverse and longitudinal cuts may be made very quickly and easily by my invention, as the conducting path can be made and the operation of cutting completed without subjecting the glass to strain or pressure. In cutting sheet and plate glass, porcelain and similar material to size, and particularly in the production of irregular shapes from such material, my invention is particularly applicable, as any desired outline can be made with the conducting path or streak upon the surface of the glass.

My invention will best be understood in connection with the accompanying drawing, in which merely for purposes of illustration I have shown one of the various forms in which my invention may be carried out, and in which—

Figure 1 shows in perspective a glass cylinder, such as is produced in the manufacture of window glass, and which is to be cut up into sections, the mechanism for supplying current being shown only diagrammatically; Fig. 2 shows a plate of glass to be cut along the irregular conducting streaks or lines drawn upon it; and Fig. 3 is a sectional view of a form of safety device applied to the contact by which current is supplied to the conducting streak on the glass.

In the particular arrangement shown in Fig. 1 for practising my invention, there is mounted upon a conducting support or table 1 a tube or cylinder 2, such as is commonly produced at certain stages in the manufacture of window glass. In accordance with my invention, I make conducting paths 3 upon the surface of the cylinders, these paths extending around the cylinder where it is to be cut. I then in any suitable manner cause a sufficient flow of current along the conducting paths 3 to cause the glass cylinder 1 to separate along these paths. I may use two current paths, in multiple to complete the flow of current around the cylinder, as shown, or a series path only may be used, almost circling the cylinder, in which case the movable electrode would be applied to one end of the path near the support which is in contact with the other end of the path. One arrangement for producing the necessary flow of current along the conducting paths is shown in the drawing, in which a contact 4 is connected through a suitable lead 5 to one end of the secondary 6 of a transformer wound to supply the proper voltage. In practice, the lead 5 is heavily insulated and armored, and has its armor grounded, so that the operator cannot be injured by accidental contact with it. The circuit from lead 5 and contact 4 through the conducting path 3 is completed by connecting the other end of the secondary 6 and the conducting path in any suitable way, preferably by grouping the other end of the winding 6 and also grounding the conducting support on table 1, as shown diagrammatically in the drawing. With the connections as shown in Fig. 1 and the conducting path 3 in contact with the grounded table 1, the application of the movable contact 4 to the conducting streak or line 3 will complete the circuit and will permit sufficient current to flow along the conducting path to cut the glass in the desired manner. In some cases it is preferable to connect the table support to the transformer, so that the support 1 is alive while the lead handled by the operator is connected to the grounded side of circuit. The particular connections may be varied in many ways as long as the connections enable the operator to cause at will a flow of current through the conducting path. Suitable means of controlling current flow such as constant current transformer or other regulating device will usually be provided to insure nicety and flexibility of operation.

I prefer, for the purpose of guarding against accidents, to use some automatic arrangement by which the circuit of the transformer will automatically be opened if the operator should let loose of the contact 4. Various safety devices may be used for this purpose, such as the arrangement shown in the drawing, in which the circuit through the primary 7 of the transformer is controlled by a relay 8 which will keep the circuit through the primary closed only so long as the relay is energized. A local circuit energizes the relay as long as the operator has hold of the contact. This local circuit is supplied from any suitable source, such as a battery 9, and is controlled by an auxiliary switch 10 mounted in the handle 11 of the contact 4. A spring 12 normally holds the switch open. When the operator grips the handle of the contact 4 the switch 10 is closed, whereupon the relay 8 is energized and closes the circuit through the primary of the transformer. As soon as the operator releases his hold on the handle 11 the switch 10 automatically opens, whereupon the circuit through the transformer is also opened.

By means of my invention sheets of glass can be cut along irregular and wavy lines as easily as long straight lines. For example, as shown in Fig. 2, the sheet 13 has marked upon it conducting lines or paths 14, which at one end are connected by any suitable means to ground. One terminal of transformer secondary 6 is also grounded. When the contact 4, connected to the other terminal of the transformer, is applied to the other end of the conducting streak 14, current flows along the conducting path and causes the glass plate to separate along that path.

The current path upon the surface of the glass may be produced in many different ways. The conducting particles must be in intimate relation to the surface of the glass and adhere to it. For example, the conducting streak may be made with a conducting paint, varnish, or paste, a solution or ink which will leave a conducting residue when dry, or a soft pencil or chalk either made of conducting material or containing powdered conducting material. The current path may also be determined by a suitable base applied to the glass and then a conducting path defined on this base, as, for example, the glass may be painted and the paint then marked with a graphite pencil. It is necessary that the material applied to determine the current path adhere well to the glass and be in conducting relation to it when hot so as to permit current to flow into the glass, so that on passage of current the heating which results is immediately communicated to the glass which becomes when hot a conductor and which, due to its negative temperature coefficient of resistance characteristic, carries the current in a narrow very hot streak or path along which fracture occurs, often while the current is flowing, and in any case as soon as the current is discontinued. No artificial cooling or chilling is ordinarily necessary to the successful operation of the invention.

With some glasses it may be advantageous to make use of suitable chemicals active to the glass, along with the usual conducting material to facilitate operation.

When a paint, ink, or similar compound is used, I prefer to make it with some volatile vehicle which will quickly evaporate and leave the conducting particles adhering to the glass. The paint or ink may be applied by squirting it out of a tube or receptacle on to the glass in the form of a fine thread or filament, by a striping brush, special fountain pen, wet string or similar device. Suitable paints or inks may be made with powdered conducting material in a vehicle of collodion or any of the usual solvents.

My invention may be carried out in many other ways than here described and I intend by the appended claims to cover all changes and modifications within the spirit of my invention and the scope of said claims.

What I claim as new and desire to secure by Letters Patent of the United States, is:—

1. The method of severing glass and similar material which consists in marking a definite high resistance path for electric current on and in intimate conducting contact with the surface of said material and directing along said path a flow of current sufficient to sever the material.

2. The method of severing a vitreous material which is a conductor of the second class consisting in establishing by any suitable means an adherent conducting streak on the surface along the line where fracture is desired and in intimate conducting contact with said surface, applying current which immediately transfers from the conducting streak to the material to be cut and produces intense local heat, and discontinuing the current flow to produce fracture along the line of current flow.

3. The method of severing glass and similar material, which consists in forming upon the surface of the material to be cut a conducting path composed of conducting particles adherent to the material, and causing an electric current to flow along said path.

4. The method of severing glass which consists in painting a conducting stripe upon the glass, and causing sufficient electric current to flow along said stripe to sever the glass.

5. The method of severing glass which consists in painting a stripe upon the glass with a conducting paint adherent to the glass, permitting said paint to dry, and then passing electric current along said stripe.

6. The method of severing glass which consists in painting a stripe upon the glass with a paint comprising a volatile vehicle and conducting material and binder adherent to the glass, evaporating said vehicle to leave an adherent conducting stripe, and passing current along the stripe of conducting material.

In witness whereof, I have hereunto set my hand this 14th day of August, 1913.

CHARLES J. BARROW.

Witnesses:
MAMIE WENDLER,
GERALD T. BROCHEUR.